US008161190B2

(12) United States Patent
Ringen

(10) Patent No.: US 8,161,190 B2
(45) Date of Patent: Apr. 17, 2012

(54) SYSTEM AND METHOD TO MANAGE STATIC INTERNET PROTOCOL ADDRESSES

(75) Inventor: Deron Ringen, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 291 days.

(21) Appl. No.: 12/636,883

(22) Filed: Dec. 14, 2009

(65) Prior Publication Data

US 2011/0145434 A1 Jun. 16, 2011

(51) Int. Cl.
*G06F 15/173* (2006.01)

(52) U.S. Cl. ......... 709/238; 709/239; 370/254; 370/392

(58) Field of Classification Search .................. 709/238, 709/239; 370/254, 392
See application file for complete search history.

(56) References Cited

U.S. PATENT DOCUMENTS

| | | | | |
|---|---|---|---|---|
| 7,185,107 | B1 * | 2/2007 | Cassar | 709/239 |
| 2008/0062891 | A1 * | 3/2008 | Van der Merwe et al. | 370/254 |
| 2009/0003350 | A1 * | 1/2009 | Guichard et al. | 370/392 |
| 2009/0116483 | A1 | 5/2009 | Anumala et al. | |
| 2009/0168666 | A1 * | 7/2009 | Unbehagen et al. | 370/254 |

OTHER PUBLICATIONS

Swallow, et al., "Network Scaling with Aggregated IP LSPSs", Cisco Systems, Inc., Jul. 2007, 10 pages.

"Classless Inter-Domain Routing", Wikipedia, the free encyclopedia, 4 pages; Retrieved on Dec. 3, 2009. <http://en.wikipedia.org/w/index.php?title=Classless_inter-Domain_Routing>.

"Understanding IP Addressing: Everything you ever Wanted to Know", 3Com Corporation, published 2001.

"Provider-aggregatable Address Space", Wikipedia, the free encyclopedia, 1 page; Retrieved on Nov. 6, 2009. <http://en.wikipedia.org/w/index.php?title=Provider-aggregatable_Address_Space>.

"Subnetwork", Wikipedia, the free encyclopedia, 4 pages; Retrieved on Nov. 6, 2009. <http://en.wikipedia.org/w/index.php?title=Subnetwork>.

"Classless Inter-Domain Routing", Wikipedia, the free encyclopedia, 5 pages; Retrieved on Nov. 6, 2009. <http://en.wikipedia.org/w/index.php?title=Classless_inter-Domain_Routing>.

* cited by examiner

*Primary Examiner* — Tammy Nguyen
(74) *Attorney, Agent, or Firm* — Toler Law Group, PC

(57) ABSTRACT

A method includes receiving, at an address management device, a first address advertisement message that indicates that a first end-user device is assigned a first static internet protocol (IP) address and is connected to a network edge device. The method includes receiving a second address advertisement message that indicates that a second end-user device is assigned a second static IP address and is connected to the network edge device. The method includes sending an aggregate advertisement message including an aggregate IP address to one or more remote devices of a second network. The aggregate advertisement message indicates to route first incoming traffic directed to the first static IP address to the address management device via the aggregate IP address and to route second incoming traffic directed to the second static IP address to the address management device via the aggregate IP address.

20 Claims, 6 Drawing Sheets

SYSTEM AND METHOD TO MANAGE STATIC INTERNET PROTOCOL ADDRESSES

FIELD OF THE DISCLOSURE

The present disclosure is generally related to managing static internet protocol addresses.

BACKGROUND

When a computing device connects to a public network, such as the Internet, the computing device is assigned an Internet Protocol (IP) address. The rapid proliferation of personal computing devices has resulted in a demand for a large number of IP addresses. To address this demand, Internet Service Providers (ISPs) may use Dynamic Host Configuration Protocol (DHCP) to dynamically assign IP addresses to computing devices when the computing devices initiate a connection to a network of the ISP. However, some subscribers of the ISP may desire to have static IP addresses rather than dynamically assigned IP addresses assigned to their computing devices.

When an ISP assigns static IP addresses to computing devices, network elements that route data within the network store the static IP addresses to enable routing of incoming traffic to the computing devices. As the number of static IP addresses increases, the network of the ISP may not scale well as the network elements that route data are requested to store, manage, and lookup an increasing number of static IP addresses.

DETAILED DESCRIPTION

Figure 1:
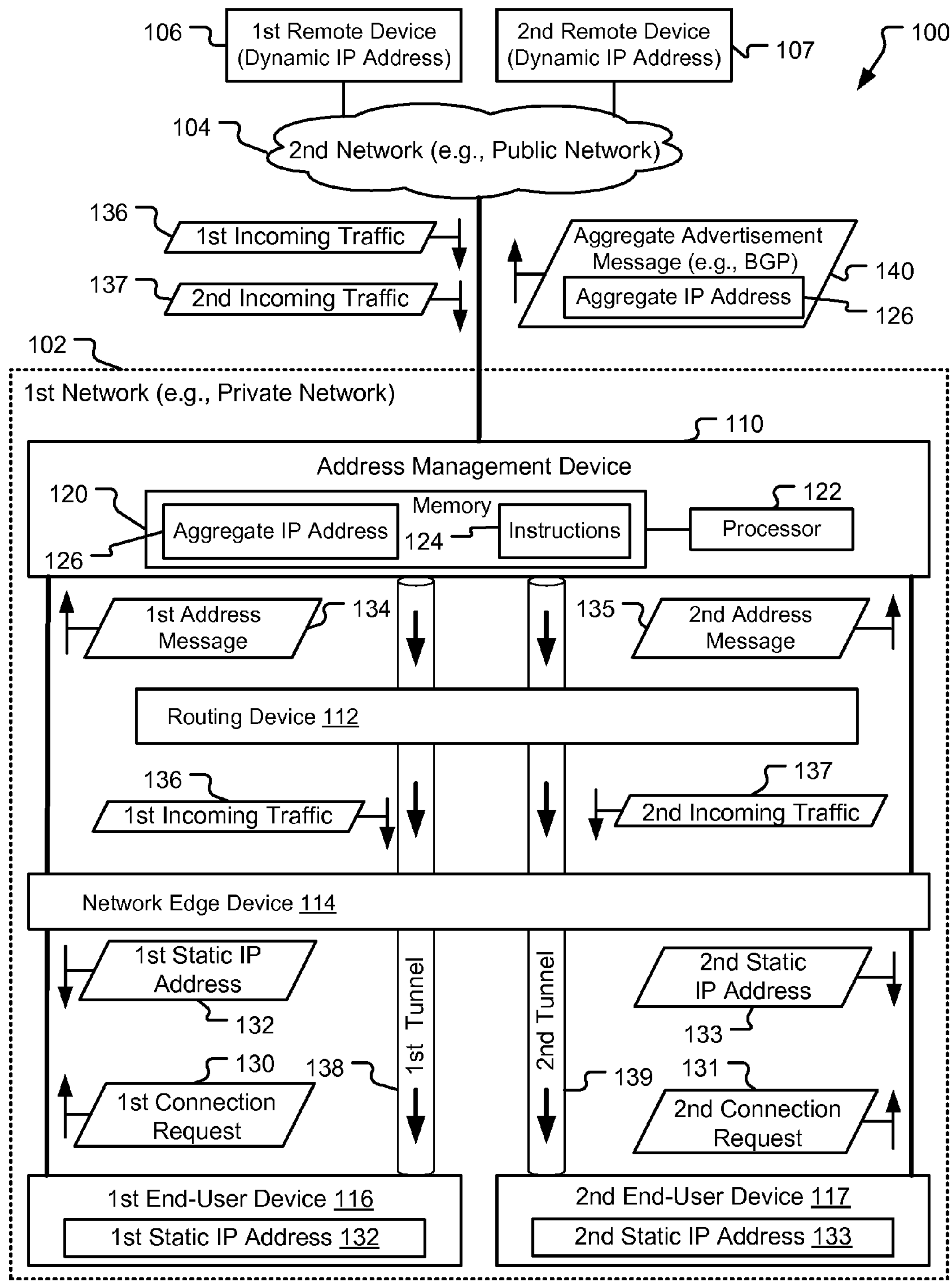
FIG. 1 is a block diagram of a first particular embodiment of a system to manage static Internet Protocol (IP) addresses.

In a private network, an address management device may be used to manage static Internet Protocol (IP) addresses. When a first end-user device sends a first connection request to a network edge device located at an edge of the private network, the network edge device assigns the first end-user device a first static IP address. The network edge device sends the first static IP address to the first end-user device and sends a first address advertisement message including the first static IP address to the address management device. When a second end-user device sends a connection request to the network edge device, the network edge device assigns the second end-user device a second static IP address. The network edge device sends the second static IP address to the second end-user device and sends a second address advertisement message including the second static IP address to the address management device. The first address advertisement message and the second address advertisement message may be Internal Gateway Protocol (IGP) compliant address advertisement messages.

The address management device creates an aggregate IP address based on the first and second static IP addresses and sends an aggregate advertisement message that includes the aggregate IP address to remote devices via a public network. The aggregate advertisement message indicates to route incoming traffic directed to the first and second end-user device to the address management device via the aggregate IP address. When the address management device receives first incoming traffic directed to the first end-user device, the address management device creates a first tunnel from the address management device to the first end-user device. The first tunnel may have a path that includes a routing device and the network edge device of the private network. The first tunnel may be created using multi-protocol label switching. For example, the first tunnel may be a label switched path. The address management device sends the first incoming traffic to the first end-user device via the first tunnel. When the address management device receives second incoming traffic directed to the second end-user device, the address management device creates a second tunnel to the second end-user device via the routing device and the network edge device of the private network. The address management device sends the second incoming traffic to the second end-user device via the second tunnel.

In a particular embodiment, a computer implemented method includes receiving, at an address management device of a first network, a plurality of address advertisement messages from one or more network edge devices of the first network. A first address advertisement message of the plurality of address advertisement messages indicates that a first end-user device is assigned a first static internet protocol (IP) address and is connected to a network edge device of the one or more network edge devices. A second address advertisement message of the plurality of address advertisement messages indicates that a second end-user device is assigned a second static IP address and is connected to the network edge device. The computer implemented method includes sending an aggregate advertisement message including an aggregate IP address to one or more remote devices of a second network. The aggregate advertisement message indicates to route first incoming traffic directed to the first static IP address to the address management device via the aggregate IP address and to route second incoming traffic directed to the second static IP address to the address management device via the aggregate IP address.

In another particular embodiment, a system includes an address management device that includes a processor and a memory that is accessible to the processor. The memory includes operational instructions that are executable by the processor to receive a plurality of address advertisement messages from one or more network edge devices of a private network associated with the address management device. A first address advertisement message of the plurality of address advertisement messages indicates that a first end-user device is assigned a first static IP address and is connected to a network edge device of the one or more network edge devices. A second address advertisement message of the plurality of address advertisement messages indicates that a second end-user device is assigned a second static IP address and is connected to the network edge device. The memory includes operational instructions that are executable by the processor to send an aggregate advertisement message including an aggregate IP address to one or more remote devices of a public network. The aggregate advertisement message indicates to route first incoming traffic from the public network directed to the first static IP address to the address management device via the aggregate IP address and to route second incoming traffic from the public network directed to the second static IP address to the address management device via the aggregate IP address.

In another particular embodiment, a computer readable storage medium includes operational instructions executable by a processor to cause the processor to receive a plurality of address advertisement messages from one or more network edge devices of a private network. A first address advertisement message of the plurality of address advertisement messages indicates that a first end-user device is assigned a first static IP address and is connected to a first network edge device. The operational instructions are further executable by the processor to cause the processor to send an aggregate advertisement message including an aggregate IP address to one or more remote devices of a public network. The aggregate advertisement message indicates to route first incoming traffic from the public network directed to the first static IP address to the address management device via the aggregate IP address.

Referring to FIG. 1, a block diagram of a first particular embodiment of a system to manage static internet protocol (IP) addresses is depicted and generally designated 100. The system 100 includes a first network 102 and a second network 104.

The second network 104 may include a public network, such as the Internet, a public switched telephone network (PSTN), a wireless network, an optical network, a packet network, another type of network, or any combination thereof. A first remote device 106 and a second remote device 107 are coupled to the second network 104. The first remote device 106 and the second remote device 107 may not have static IP addresses assigned to them. For example, the remote devices 106-107 may have dynamically assigned IP addresses. The remote devices 106-107 may send traffic in the form of data packets to the first network 102 via the second network 104.

The first network 102 includes at least one address management device 110, at least one routing device 112, at least one network edge device 114, and multiple end-user devices, including a first end-user device 116 and a second end-user device 117. Each of the end-user devices 116-117 may be a computing device, such as a personal digital assistant, a media playback device, a wireless telephony device, another type of computing device, or any combination thereof. The first end-user device 116 may be assigned a first static IP address 132 to enable the first end-user device 116 to access the first network 102. The second end-user device 117 may be assigned a second static IP address 133 to enable the second end-user device 117 to access the first network 102.

Edge network elements of the first network 102, such as the network edge device 114, may assign IP addresses to end-user devices that are associated with subscribers to the first network 102 to enable the end-user devices to access the first network 102. For example, the network edge device 114 may assign the first static IP address 132 to the first end-user device 116 and may assign the second static IP device 133 to the second end-user device 117 to enable the end-user devices 116-117 to access the first network 102.

Routing devices of the network 102, such as the routing device 112, may route incoming traffic from the address management device 110 to end-user devices. For example, the address management device 110 may use the routing device 112 to create a tunnel to send traffic from the address management device 110 to the end-user devices 116-117.

The address management device 110 includes a memory 120 and a processor 122. The memory 120 includes instructions 124 that are executable by the processor 122 to perform various functions of the address management device 110. The address management device 110 may store static IP addresses that are assigned to end-user devices, such as the static IP addresses 132-133. The address management device 110 may relieve routing devices of the network 102 (e.g., the routing device 112) from storing static IP addresses, thereby enabling the routing elements to easily scale to support many static IP addresses.

In operation, the first end-user device 116 may send a first connection request 130 to the network edge device 114. In response, the network edge device 114 may authenticate the first end-user device 116 and assign the first static IP address 132 to the first end-user device 116. The network edge device 114 may send the first static IP address 132 to the first end-user device 116 to enable the first end-user device 116 to access the first network 102. The network edge device 114 may send a first address message 134 to the address management device 110. The first address message 134 may be an Internal Gateway Protocol (IGP) compliant address advertisement message. The first address message 134 may advertise to the address management device 110 that the first static IP address 132 has been assigned to the first end-user device 116. The network edge device 114 may send the first static IP address 132 to the first end-user device 116 substantially simultaneously with sending the first address message 134 to the address management device 110.

The second end-user device 117 may send a second connection request 131 to the network edge device 114. In response, the network edge device 114 may authenticate the second end-user device 117 and assign the second static IP address 133 to the second end-user device 117. The network edge device 114 may send the second static IP address 133 to the second end-user device 117 to enable the second end-user device 117 to access the first network 102. The network edge device 114 may send a second address message 135 to the address management device 110. The second address message 135 may be an IGP compliant address message. The second address message 135 may advertise to the address management device 110 that the second static IP address 133 has been assigned to the second end-user device 117.

The address management device 110 may receive address messages (e.g., the address messages 134-135) from network edge devices (e.g., the network edge device 114) of the network 102 and create an aggregate IP address 126 based on the received address messages. For example, the static IP addresses 132-133 may share a common prefix and the aggregate IP address 126 may include the common prefix. The aggregate IP address 126 may be stored as a record at the address management device 110.

The address management device 110 may send an aggregate advertisement message 140 to remote devices that are coupled to the second network 104, such as the remote devices 106-107. The aggregate advertisement message 140 may include the aggregate IP address 126. The aggregate advertisement message 140 may be a Border Gateway Protocol (BGP) compliant advertisement message. The aggregate advertisement message 140 may indicate to route incoming traffic directed to static IP addresses within the first network 102 via the aggregate IP address 126. For example, first incoming traffic 136 directed to the first end-user device 116 and second incoming traffic 137 directed to the second end-user device 117 may be sent via the aggregate IP address 126.

The address management device 110 may receive the first incoming traffic 136 from a remote device coupled to the second network 104 (e.g. one of the remote devices 106-107) and create a first tunnel 138 from the address management device 110 to the first end-user device 116. For example, the address management device 110 may encapsulate packets of the incoming traffic 136 to create the first tunnel 138. A path of the first tunnel 138 may include the routing device 112 and the network edge device 114. The address management device 110 may send the first incoming traffic 136 to the first end-user device 116 via the first tunnel 138. The first tunnel 138 may be created using Multi-Protocol Label Switching (MPLS). For example, the first tunnel 138 may be an MPLS Label Switched Path (LSP).

The address management device 110 may receive second incoming traffic 137 from a remote device coupled to the second network 104 (e.g. one of the remote devices 106-107). The address management device 110 may create a second tunnel 139 from the address management device 110 to the second end-user device 117. The second tunnel 139 may have a path that includes the routing device 112 and the network edge device 114. In a particular embodiment, the second tunnel 139 may be an MPLS LSP. The address management device 110 may send the second incoming traffic 137 to the second end-user device 117 via the second tunnel 139.

Thus, when the static IP addresses 132-133 are assigned to the end-user devices 116-117 of the first network 102, the address management device 110 may send incoming traffic directed to the static IP addresses 132-133 to the end-user devices 116-117 via tunnels 138-139. The tunnels 138-139 may be created through one or more routing devices, such as the routing device 112. By doing so, each network element in the first network 102 that performs a routing function, such as the routing device 112, no longer stores the static IP addresses 132-133. By relieving each network element in the first network 102 that performs a routing function from storing the static IP addresses 132-133, the address management device 110 enables the first network 102 to scale to support many static IP addresses.

Figure 2:
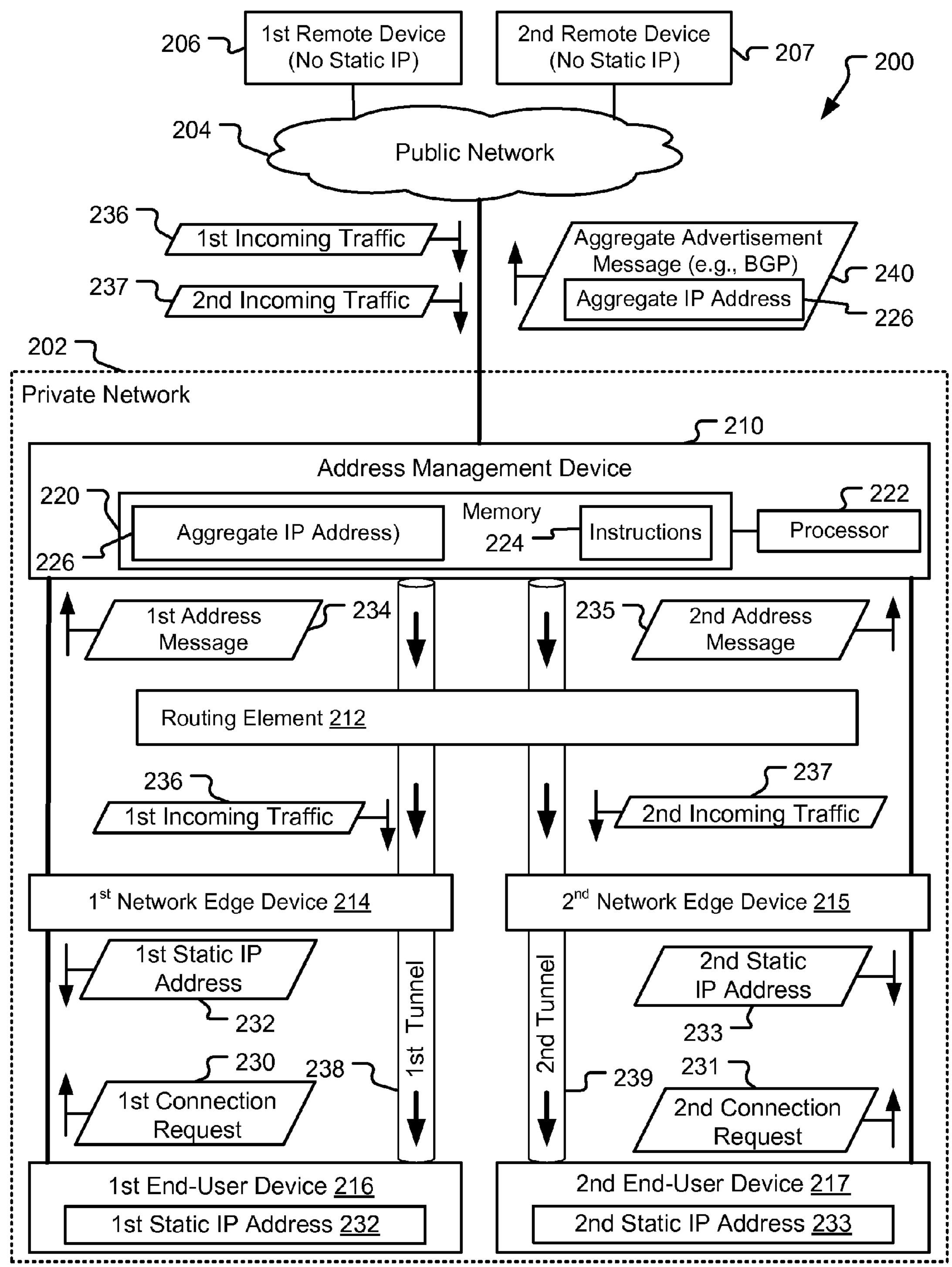
FIG. 2 is a block diagram of a second particular embodiment of a system to manage static IP addresses.

Referring to FIG. 2, a block diagram of a second particular embodiment of a system to manage static internet protocol (IP) addresses is depicted and generally designated 200. The system 200 includes a private network 202 and a public network 204.

The public network 204 may include a a public network, such as the Internet, public switched telephone network (PSTN), a wireless network, an optical network, a packet network, another type of network, or any combination thereof. A first remote device 206 and a second remote device 207 are coupled to the public network 204. The first remote device 206 and the second remote device 207 may not have static IP addresses assigned to them. For example, the remote devices 206-207 may have dynamically assigned IP addresses. The remote devices 206-207 may send traffic in the form of data packets to the private network 202 via the public network 204.

The private network 202 includes at least one address management device 210, at least one routing element 212, at least a first network edge device 214 and a second network edge device 215, and multiple end-user devices, including a first end-user device 216 and a second end-user device 217. Each of the end-user devices 216-217 may be a computing device, such as a personal digital assistant, a media playback device, a wireless telephony device, another type of computing device, or any combination thereof. The first end-user device 216 may be assigned a first static IP address 232 to enable the first end-user device 216 to access the private network 202. The second end-user device 217 may be assigned a second static IP address 233 to enable the second end-user device 217 to access the private network 202.

Edge network elements of the private network 202, such as the network edge devices 214-215, may assign IP addresses to end-user devices that are associated with subscribers to the private network 202 to enable the end-user devices to access the private network 202. For example, the first network edge device 214 may assign the first static IP address 232 to the first end-user device 216 to enable the first end-user device 216 to access the private network 202. The second network edge device 215 may assign the second static IP device 233 to the second end-user device 217 to enable the second end-user device 217 to access the private network 202.

Routing devices of the network 202, such as the routing element 212, may route incoming traffic from the address management device 210 to end-user devices. For example, the address management device 210 may use the routing element 212 to create a tunnel to send traffic from the address management device 210 to the end-user devices 216-217. Routing devices of the network 202 (e.g., the routing element 212) may not store and manage static IP addresses (e.g., the static IP addresses 232-233).

The address management device 210 includes a memory 220 and a processor 222. The memory 220 includes instructions 224 that may be executable by the processor 222 to perform various functions of the address management device 210. The address management device 210 may store static IP addresses (e.g., the static IP addresses 232-233) that are assigned to end-user devices. For example, the address management device may be the only network element of the private network 202 that stores the static IP addresses 232-233. To illustrate, the first network edge device 114 manages (e.g., keeps track of) static IP addresses that the first network edge device 114 assigns to end-user devices, such as the first static IP address 232 that is assigned to the first end-user device 216. The second network edge device 115 manages static IP addresses that the second network edge device 115 assigns to end-user devices, such as the second static IP address 233 that is assigned to the second end-user device 217. In the private network 202, only the address management device 210 manages the static IP addresses assigned by more than one network edge device. The address management device 210 may relieve routing devices of the network 202 (e.g., the routing element 212) from managing static IP addresses, thereby enabling the routing elements to more easily scale to support many static IP addresses.

In operation, the first end-user device 216 may send a first connection request 230 to the first network edge device 214. In response, the first network edge device 214 may authenticate the first end-user device 216 and assign the first static IP address 232 to the first end-user device 216. The first network edge device 214 may send the first static IP address 232 to the first end-user device 216 to enable the first end-user device 216 to access the private network 202. The first network edge device 214 may send a first address message 234 to the address management device 210. The first address message 234 may be an Internal Gateway Protocol (IGP) compliant address advertisement message. The first address message 234 may advertise to the address management device 210 that the first static IP address 232 has been assigned to the first end-user device 216. The first network edge device 214 may send the first static IP address 232 to the first end-user device 216 substantially simultaneously with sending the first address message 234 to the address management device 210.

The second end-user device 217 may send a second connection request 231 to the second network edge device 215. In response, the second network edge device 215 may authenticate the second user-device 217 and assign the second static IP address 233 to the second end-user device 217. The second network edge device 215 may send the second static IP address 233 to the second end-user device 217 to enable the second end-user device 217 to access the private network 202. The second network edge device 215 may send a second address message 235 to the address management device 210. The second address message 235 may be an IGP compliant address message. The second address message 235 may advertise to the address management device 210 that the second static IP address 233 has been assigned to the second end-user device 217.

The address management device 210 may receive address messages (e.g., the address messages 234-235) from network edge devices (e.g., the network edge devices 214-215) of the private network 202 and create an aggregate IP address 226 based on the received address messages. For example, the static IP addresses 232-233 may share a common prefix and the aggregate IP address 226 may include the common prefix. The aggregate IP address 226 may be stored as a record at the address management device 210.

The address management device 210 may send an aggregate advertisement message 240 to remote devices (e.g., the remote devices 206-207) that are coupled to the public network 204. The aggregate advertisement message 240 may include the aggregate IP address 226. The aggregate advertisement message 240 may be a Border Gateway Protocol (BGP) compliant advertisement message. The aggregate advertisement message 240 may indicate to route incoming traffic directed to static IP addresses within the private network 202 via the aggregate IP address 226. For example, first incoming traffic 236 directed to the first end-user device 216 and second incoming traffic 237 directed to the second end-user device 217 may be sent via the aggregate IP address 226.

The address management device 210 may receive the first incoming traffic 236 from a remote device coupled to the public network 204 (e.g. one of the remote devices 206-207) and create a first tunnel 238 from the address management device 210 to the first end-user device 216. A path of the first tunnel 238 may include the routing element 212 and the first network edge device 214. The address management device 210 may send the first incoming traffic 236 to the first end-user device 216 via the first tunnel 138. The first tunnel 238 may be created using Multi-Protocol Label Switching (MPLS). For example, the first tunnel 238 may be an MPLS Label Switched Path (LSP).

The address management device 210 may receive second incoming traffic 237 from a remote device coupled to the public network 204 (e.g. one of the remote devices 206-207). The address management device 210 may create a second tunnel 239 from the address management device 210 to the second end-user device 217. The second tunnel 239 may have a path that includes the routing element 212 and the second network edge device 215. In a particular embodiment, the second tunnel 239 may be an MPLS LSP. The address management device 210 may send the second incoming traffic 237 to the second end-user device 217 via the second tunnel 239.

When the static IP addresses 232-233 are assigned to the end-user devices 216-217 of the private network 202, the address management device 210 may send incoming traffic directed to the static IP addresses 232-233 to the end-user devices 216-217 via the tunnels 238-239. The tunnels 238-139 may have a path that includes one or more routing devices, such as the routing element 212. Thus, each network element in the private network 202 that performs a routing function, such as the routing element 212 and the network edge devices 214-215, may not manage all of the static IP addresses (e.g. the static IP addresses 232-233). By relieving each network element in the private network 202 that performs a routing function from storing all of the static IP addresses, the address management device 210 enables the private network 202 to scale to support many static IP addresses.

Figure 3:
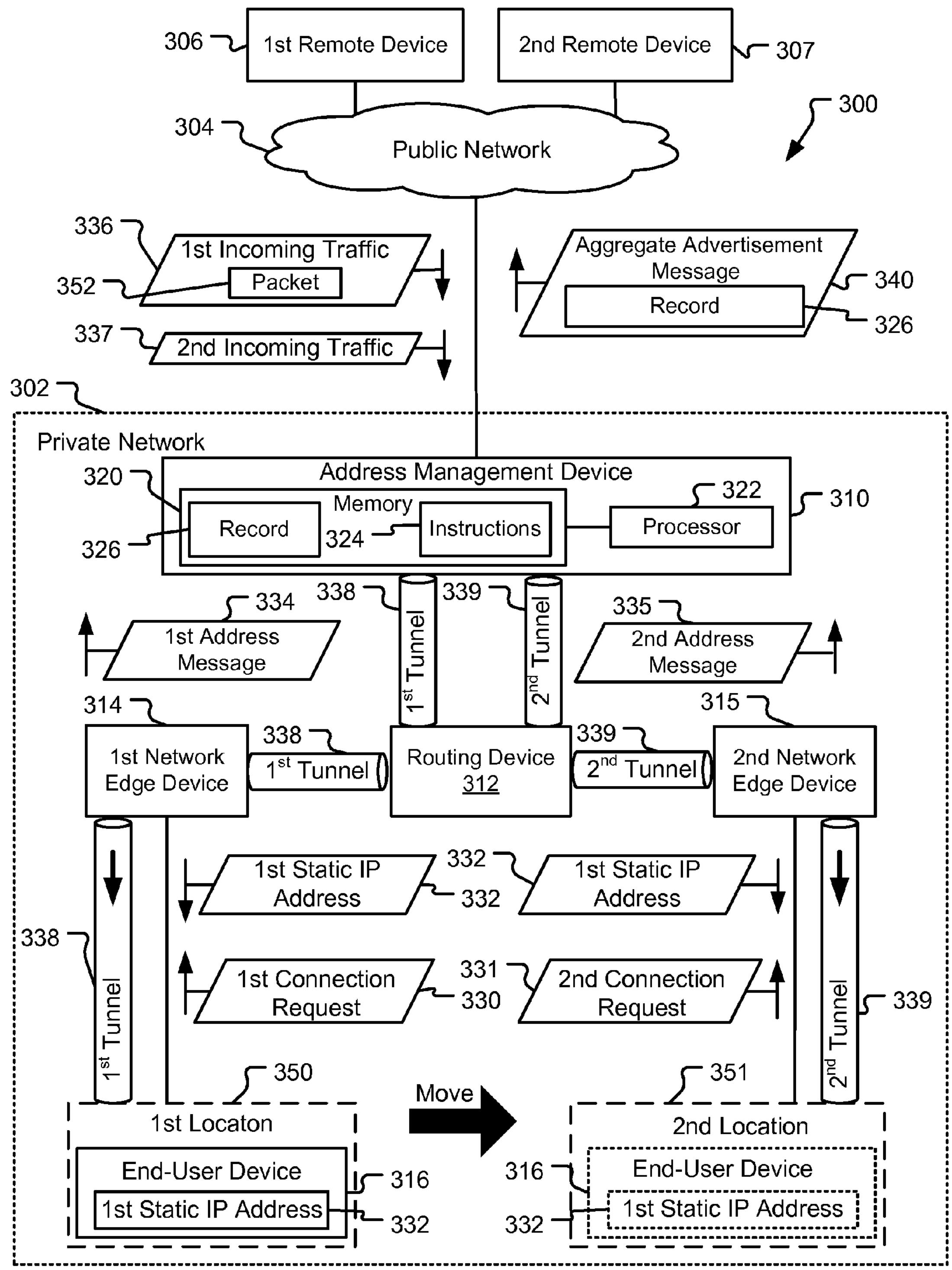
FIG. 3 is a block diagram of a third particular embodiment of a system to manage static IP addresses.

Referring to FIG. 3, a block diagram of a third particular embodiment of a system to manage static internet protocol (IP) addresses is depicted and generally designated 300. The system 300 includes a private network 302 and a public network 304.

The public network 304 may include a public switched telephone network (PSTN), a wireless network, an optical network, a packet network, another type of network, or any combination thereof. The public network 304 may be a public network, such as the Internet. A first remote device 306 and a second remote device 307 are coupled to the public network 304. The remote devices 306-307 may send traffic in the form of data packets to the private network 302 via the public network 304.

The private network 302 includes at least one address management device 310, at least one routing device 312, network edge devices including a first network edge device 314 and a second network edge device 315, and multiple end-user devices such as an end-user device 316. The end-user device 316 may be a computing device, a personal digital assistant, a media playback device, a wireless telephony device, another type of computing device, or any combination thereof. The end-user device 316 may be assigned a first static IP address 332 to enable the end-user device 316 to access the private network 302.

Edge network elements of the private network 302, such as the network edge devices 314-315, may assign IP addresses to end-user devices that are associated with subscribers to the private network 302 to enable the end-user devices to access the private network 302. For example, the first network edge device 314 may assign the first static IP address 332 to the end-user device 316 at a first location 350.

Routing devices of the network 302, such as the routing device 312, may route incoming traffic from the address management device 310 to end-user devices. For example, the routing device 312 may be in a path of a tunnel from the address management device 310 to the end-user device 316. Routing devices of the network 302 (e.g., the routing device 312) may not store and manage static IP addresses (e.g. the static IP address 332).

The address management device 310 includes a memory 320 and a processor 322. The memory 320 includes instructions 324 that may be executable by the processor 322 to perform various functions of the address management device 310. The address management device 310 may store static IP addresses that are assigned to end-user devices, such as the static IP address 332. The address management device 310 may relieve routing devices of the network 302 (e.g., the routing device 312) from storing static IP addresses, thereby enabling the routing elements to more easily scale to support many static IP addresses.

In operation, the end-user device 316 at the first location 350 may send a first connection request 330 to the first network edge device 314. In response, the first network edge device 314 may authenticate the end-user device 316 and assign the first static IP address 332 to the end-user device 316 at the first location 350. The first network edge device 314 may send the first static IP address 332 to the end-user device 316 to enable the end-user device 316 to access the private network 302 at the first location 350. The first network edge device 314 may send a first address message 334 to the address management device 310. The first address message 334 may be an Internal Gateway Protocol (IGP) compliant address advertisement message. The first address message 334 may advertise to the address management device 310 that the first static IP address 332 has been assigned to the end-user device 316. The first network edge device 314 may send the first static IP address 332 to the end-user device 316 substantially simultaneously with sending the first address message 334 to the address management device 310.

The address management device 310 may receive the first address message 334 from the first network edge device 316 and create a record 326 based on the received first address message 334. The record 326 may include information associating the first network edge device 314 with the first static IP address 332. The address management device 310 may send an aggregate advertisement message 340 to remote devices that are coupled to the public network 304. The aggregate advertisement message 340 may include the record 326. The aggregate advertisement message 340 may be a Border Gateway Protocol (BGP) compliant advertisement message. The aggregate advertisement message 340 may be sent to one or more remote devices (e.g., the remote devices 306-307) that are coupled to the public network 304. The aggregate advertisement message 340 may indicate to route incoming traffic directed to the first static IP address 332 using information included in the record 326. For example, first incoming traffic 336 directed to the end-user device 316 may be sent to the address management device 310 using information (e.g., an aggregate IP address) included in the record 326. In response, the address management device 310 may access the record 326 to determine the first static IP address 332 associated with the end-user device 316 at the first location 350. The address management device 310 may encapsulate one or more packets (e.g. packet 352) of the first incoming traffic 336 with the first static IP address 332 associated with the end-user device 316 at the first location 350. The address management device 310 may route the first incoming traffic 336 to the first static IP address 332 via a first tunnel 338.

The address management device 310 may receive a second address message 335 from the second network edge device 315 indicating that the end-user device 316 is disconnected from the first network edge device 314 and has connected to the second network edge device 315. The address management device 310 may receive second incoming traffic 337 directed to the end-user device 316. The address management device 310 may establish a second tunnel 339 between the address management device 310 and the second network edge device 315 to route the second incoming traffic 337 to the end-user device 316 at the second location 351. The address management device 310 may send the second incoming traffic 337 to the end-user device 316 via the second tunnel 339.

Thus, when the end-user device 316 is at the first location 350, the address management device 310 may send the first incoming traffic 336 directed to the first static IP address 332 via the first tunnel 338. When the end-user device 316 is at the second location 351, the address management device 310 may send the second incoming traffic 337 directed to the first static IP address 332 via the second tunnel 339. By doing so, each network element in the private network 302 that performs a routing function, such as the routing device 312, no longer stores the static IP address 332. By relieving each network element in the private network 302 that performs a routing function from storing the static IP address 332, the address management device 310 enables the private network 302 to scale to support many static IP addresses.

Figure 4:
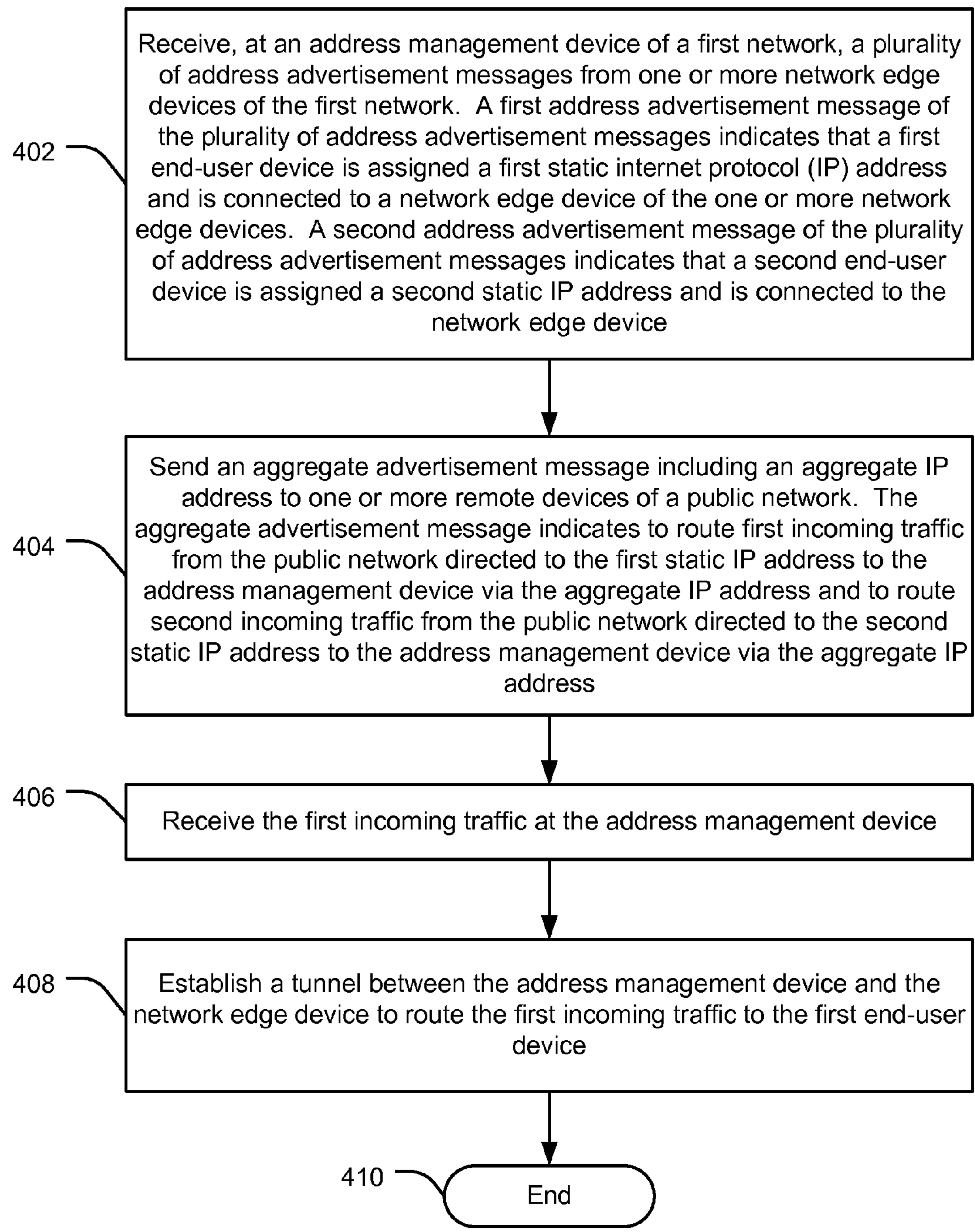
FIG. 4 is a flow diagram of a first particular embodiment of a method to manage static IP addresses.

FIG. 4 is a flow diagram of a first particular embodiment of a method to manage static IP addresses. The method may be performed by an address management device, such as the address management device 110 of FIG. 1, the address management device 210 of FIG. 2, or the address management device 310 of FIG. 3.

The method begins at 402, receiving a plurality of address advertisement messages from one or more network edge devices of the first network at an address management device of a first network. A first address advertisement message of the plurality of address advertisement messages indicates that a first end-user device is assigned a first static internet protocol (IP) address and is connected to a network edge device of the one or more network edge devices. A second address advertisement message of the plurality of address advertisement messages indicates that a second end-user device is assigned a second static IP address and is connected to the network edge device. For example, in FIG. 1, the address management device 110 may receive the first address message 134 indicating that the first end-user device 116 is assigned the first static IP address 132 and may receive the second address message 135 indicating that the second end-user device 117 is assigned the second static IP address 133.

Moving to 404, an aggregate advertisement message including an aggregate IP address is sent to one or more remote devices of a public network. The aggregate advertisement message indicates to route first incoming traffic from the public network directed to the first static IP address to the address management device via the aggregate IP address and to route second incoming traffic from the public network directed to the second static IP address to the address management device via the aggregate IP address. For example, in FIG. 1, the address management device 110 may send the aggregate advertisement message 140 including the aggregate IP address 126 to the remote devices 106-107. The aggregate IP address 126 may indicate to direct incoming traffic to the end-user devices 117-118 via the aggregate IP address 126. Advancing to 406, the first incoming traffic may be received at the address management device and the address management device may establish a tunnel between the address management device and the network edge device to route the first incoming traffic to the first end-user device, at 408. For example, the address management device 110 may create the first tunnel 138 to the first end-used device 116 and send the first incoming traffic 136 to the first end-user device 116 via the first tunnel 138. The method ends at 410.

Thus, an address management device may advertise static IP addresses associated with end-user devices of a private network using an aggregate advertisement message. The address management device may create tunnels to send incoming traffic to the end-user devices. By utilizing the address management device, a service provider may more easily scale the private network to support a large number of the static IP addresses because the address management device relives the routing elements of the private network from storing the static IP addresses.

Figure 5:
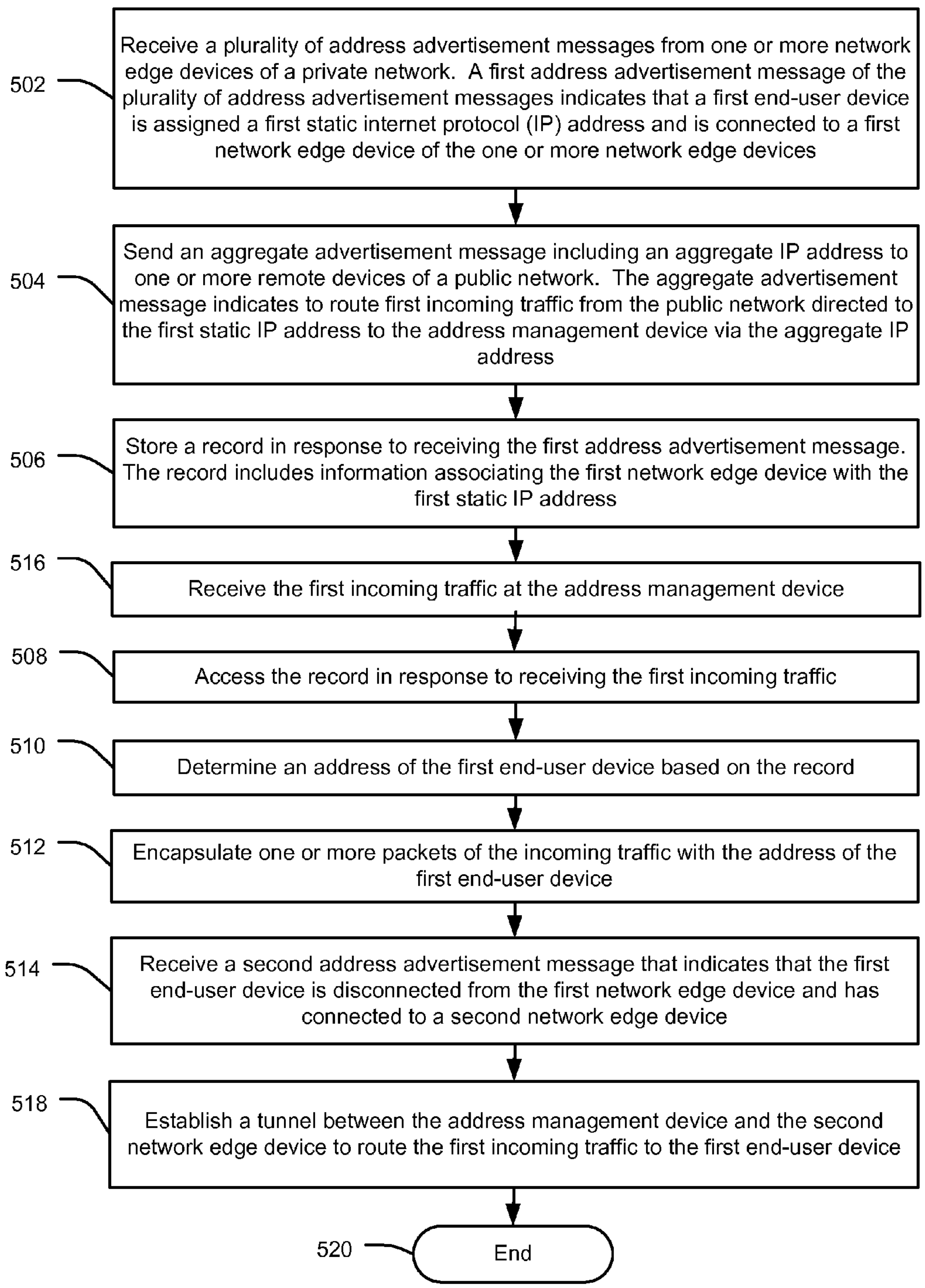
FIG. 5 is a flow diagram of a second particular embodiment of a method to manage static IP addresses.

FIG. 5 is a flow diagram of a second particular embodiment of a method to manage static IP addresses. The method may be performed by an address management device, such as the address management device 110 of FIG. 1, the address management device 210 of FIG. 2, or the address management device 310 of FIG. 3.

The method begins at 502, when a plurality of address advertisement messages are received from one or more network edge devices of a private network. A first address advertisement message of the plurality of address advertisement messages indicates that a first end-user device is assigned a first static internet protocol (IP) address and is connected to a first network edge device of the one or more network edge devices. Moving to 504, an aggregate advertisement message including an aggregate IP address is sent to one or more remote devices of a public network. For example, in FIG. 3, the address management device 310 receives the first address message 334 from the first network edge device 314 and sends the aggregate advertisement message 340 to the remote devices 306-307. The aggregate advertisement message indicates to route first incoming traffic from the public network directed to the first static IP address to the address management device via the aggregate IP address. Advancing to 506, a record is stored in response to receiving the first address advertisement message. The record includes information associating the first network edge device with the first static IP address. For example, the record may be an aggregate IP address.

Continuing to 508, the first incoming traffic is received at the address management device. Proceeding to 510, the record is accessed in response to receiving the first incoming traffic. Continuing to 512, an address of the first end-user device is determined based on the record. Moving to 514, one or more packets of the incoming traffic are encapsulated with the address of the first end-user device. For example, in FIG. 3, the address management device 310 may receive the first incoming traffic 336 and encapsulate the packet 352 for transmission to the end-user device 316 via the first tunnel 338.

Advancing to 516, a second address advertisement message is received that indicates that the first end-user device is disconnected from the first network edge device and has connected to a second network edge device. Continuing to 518, a tunnel is established between the address management device and the second network edge device to route the first incoming traffic to the first end-user device. For example, in FIG. 3, the address management device 310 may receive the second address message 335 indicating that the end-user device 316 has been assigned the first static IP address 332 at the second location 351. The address management device 310 may create the second tunnel 339 from the address management device 310 to the end-user device 316. The address management device 310 may send the second incoming traffic 337 to the end-user device 316 at the second location 351 via the second tunnel 339. The method ends at 520.

Figure 6:
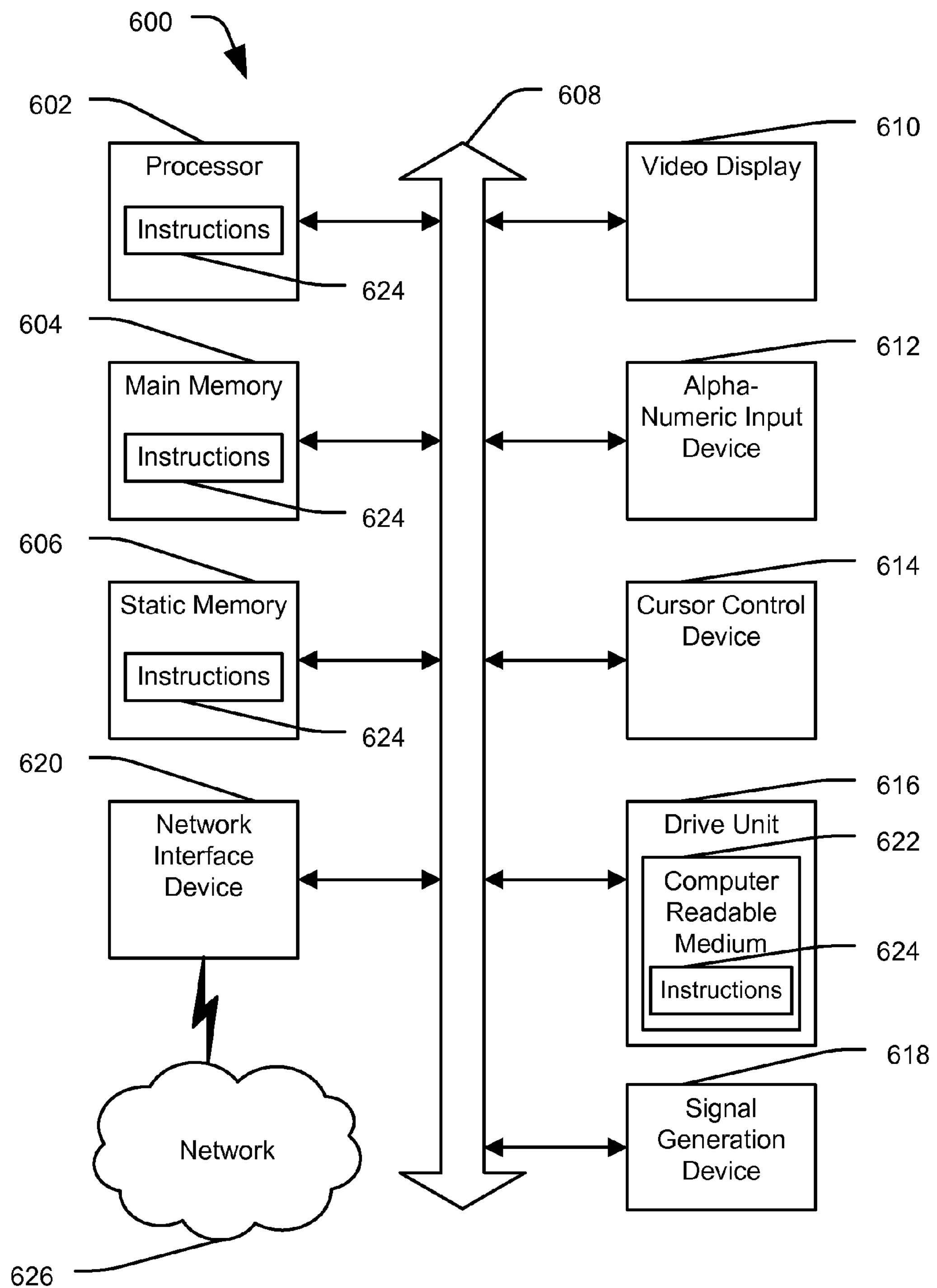
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. The computer system 600 may include or be included within any one or more of the address management device 110 of FIG. 1, the routing device 112 of FIG. 1, the network edge device 114 of FIG. 1, the end-user devices 116-117 of FIG. 1, the address management device 210 of FIG. 2, the routing element 212 of FIG. 2, the network edge device 214 of FIG. 2, the end-user devices 216-217 of FIG. 2, the address management device 310 of FIG. 3, the routing device 312 of FIG. 3, the network edge devices 314-315 of FIG. 3, the end-user device 316 of FIG. 3, or any combination thereof.

In a networked deployment, the computer system 600 may operate in the capacity of an address management device, a routing device, a network edge device, an end-user device, a remote device, or any combination thereof, as described above with reference to FIGS. 1-3. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, or a solid-state display. Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable storage medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable storage media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 624 to enable a device connected to a network 626 to communicate voice, video or data over the network 626. Further, the instructions 624 may be transmitted or received over the network 626 via the network interface device 620.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable storage medium can be a random access memory or other volatile re-writable memory. Additionally, the computer-readable storage medium can include a magneto-optical, such as a disk or tapes or other storage device. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, IGP, BGP, MPLS, and ATM) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A computer implemented method, comprising:

receiving, at an address management device of a first network, a plurality of address advertisement messages from one or more network edge devices of the first network, wherein a first address advertisement message of the plurality of address advertisement messages indicates that a first end-user device is assigned a first static internet protocol address and is connected to a network edge device of the one or more network edge devices, and wherein a second address advertisement message of the plurality of address advertisement messages indicates that a second end-user device is assigned a second static internet protocol address and is connected to the network edge device; and sending an aggregate advertisement message including an aggregate internet protocol address to one or more remote devices of a second network, wherein the aggregate advertisement message indicates to route first incoming traffic directed to the first static internet protocol address to the address management device via the aggregate internet protocol address and to route second incoming traffic directed to the second static internet protocol address to the address management device via the aggregate internet protocol address.

2. The computer implemented method of claim 1, further comprising:

receiving the first incoming traffic at the address management device; and establishing a tunnel between the address management device and the network edge device to route the first incoming traffic to the first end-user device.

3. The computer implemented method of claim 2, wherein the tunnel is established using multi-protocol label switching.

4. The computer implemented method of claim 1, further comprising routing the first incoming traffic to the network edge device associated with the first static internet protocol address via a multi-protocol label switching label switched path.

5. The computer implemented method of claim 1, wherein the plurality of address advertisement messages are interior gateway protocol compliant address advertisement messages.

6. The computer implemented method of claim 1, wherein the network edge device of the first network sends the first address advertisement message in response to authenticating the first end-user device.

7. The computer implemented method of claim 1, wherein the first static internet protocol address and the second static internet protocol address share a common prefix.

8. The computer implemented method of claim 7, wherein the aggregate internet protocol address includes the common prefix.

9. A system, comprising:
an address management device, the address management device comprising:
a processor; and
a memory accessible to the processor, the memory including operational instructions that are executable by the processor to:
receive a plurality of address advertisement messages from one or more network edge devices of a private network associated with the address management device, wherein a first address advertisement message of the plurality of address advertisement messages indicates that a first end-user device is assigned a first static internet protocol address and is connected to a network edge device of the one or more network edge devices, and wherein a second address advertisement message of the plurality of address advertisement messages indicates that a second end-user device is assigned a second static internet protocol address and is connected to the network edge device; and
send an aggregate advertisement message including an aggregate internet protocol address to one or more remote devices of a public network, wherein the aggregate advertisement message indicates to route first incoming traffic from the public network directed to the first static internet protocol address to the address management device via the aggregate internet protocol address and to route second incoming traffic from the public network directed to the second static internet protocol address to the address management device via the aggregate internet protocol address.

10. The system of claim 9, further comprising one or more routing elements within the private network, wherein the one or more routing elements do not store data associating the first static internet protocol address with the first end-user device.

11. The system of claim 9, wherein, within the private network, only the address management device stores routing data that associates the first static internet protocol address with the first end-user device and associates the second static internet protocol address with the second end-user device.

12. The system of claim 9, wherein the aggregate advertisement message is sent to the one or more remote devices of the public network via a border gateway protocol compliant advertisement message.

13. The system of claim 9, wherein the operational instructions are further executable by the processor to:
receive the first incoming traffic at the address management device; and
establish a multi-protocol label switching tunnel between the address management device and the network edge device.

14. The system of claim 13, wherein the operational instructions are further executable by the processor to route the first incoming traffic to the first end-user device via the multi-protocol label switching tunnel.

15. The system of claim 9, wherein the address management device is a network element of the private network.

16. A non-transitory computer readable storage medium comprising operational instructions executable by a processor to cause the processor to:
receive, at an address management device of a first network, a plurality of address advertisement messages from one or more network edge devices of the first network, wherein a first address advertisement message of the plurality of address advertisement messages indicates that a first end-user device is assigned a first static internet protocol address and is connected to a network edge device of the one or more network edge devices, and wherein a second address advertisement message of the plurality of address advertisement messages indicates that a second end-user device is assigned a second static internet protocol address and is connected to the network edge device; and
send an aggregate advertisement message including an aggregate internet protocol address to one or more remote devices of a second network, wherein the aggregate advertisement message indicates to route first incoming traffic directed to the first static internet protocol address to the address management device via the aggregate internet protocol address and to route second incoming traffic directed to the second static internet protocol address to the address management device via the aggregate internet protocol address.

17. The non-transitory computer readable storage medium of claim 16, wherein the operational instructions are further executable by the processor to store a record in response to receiving the first address advertisement message, wherein the record includes information associating the network edge device with the first static internet protocol address.

18. The non-transitory computer readable storage medium of claim 17, wherein the operational instructions are further executable by the processor to:
access the record in response to receiving the first incoming traffic; and
determine the first static internet protocol address of the first end-user device based on the record.

19. The non-transitory computer readable storage medium of claim 18, wherein the operational instructions are further executable by the processor to encapsulate one or more packets of the first incoming traffic with the first static internet protocol address of the first end-user device.

20. The non-transitory computer readable storage medium of claim 16, wherein the operational instructions are further executable by the processor to:
receive a third address advertisement message that indicates that the first end-user device is disconnected from the network edge device and has connected to a second network edge device;
receive third incoming traffic directed to the first end-user device at the address management device; and
establish a tunnel between the address management device and the second network edge device to route the third incoming traffic to the first end-user device.

* * * * *